United States Patent Office 3,535,356
Patented Oct. 20, 1970

3,535,356
PROCESS FOR PRODUCING DICYCLOPENTA-
DIENYLIRON COMPOUNDS
Robert J. Hartle, Gibsonia, and Ilgvars J. Spilners, Monroeville, Pa., assignors to Gulf Research & Development Company, Pittsburgh, Pa., a corporation of Delaware
No Drawing. Filed June 11, 1968, Ser. No. 736,013
Int. Cl. C07f 15/02; C10l 1/30
U.S. Cl. 260—439                                       6 Claims

ABSTRACT OF THE DISCLOSURE

Dicyclopentadienyliron and its alkyl-substituted derivatives are obtained in a process which includes the following steps:

(1) reacting solid anhydrous ferrous chloride with a saturated solution of sodium methoxide in methanol;
(2) introducing a small amount of iron powder into the ferrous methoxide-sodium methoxide in methanol, reaction mixture of (1);
(3) reacting the ferrous methoxide-sodium methoxide in methanol and powdered iron mixture of (2) with cyclopentadiene or its alkyl-substituted derivatives; and
(4) separating the resultant dicyclopentadienyliron compound from the reaction mixture of (3).

This invention relates to a process for the production of dicyclopentadienyliron compounds, especially dicyclopentadienyliron compounds having the formula $$(C_5H_{5-n}R_n)_2Fe$$

in which $C_5H_{5-n}$ is a cyclopentadienyl radical, R is selected from the group consisting of hydrogen and alkyl radicals having 1 to 4 carbon atoms and $n$ is an integer of 0 to 5. A specific example of a dicyclopentadienyliron compound of the above formula where R is hydrogen and $n$ is 1 is dicyclopentadienyliron, more commonly known as "ferrocene." Since dicyclopentadienyliron is known to the art as "ferrocene," the compounds which can be prepared by the process of the invention can be regarded as ferrocene and alkyl-substituted derivatives of ferrocene.

Ferrocene and its alkyl-substituted derivatives are valuable additives for use in various organic compositions, particularly hydrocarbons comprising gasolines and other petroleum products including lubricating oils, turbine oils, transformer oils, kerosenes, diesel fuels, jet fuels, fuel oils, greases, asphalts, waxes, insecticides and the like.

Many methods for preparing ferrocene have been disclosed previously. For example, ferrocene has been prepared by passing a mixture of cyclopentadiene and nitrogen over a reduced iron at 300° C. This method, however, requires frequent reactivation and/or replacement of the iron. According to another method, ferrocene has been prepared by a Grignard synthesis starting with cyclopentadiene, ethyl magnesium bromide and ferric chloride. A further method for preparing ferrocene comprises reacting gaseous cyclopentadiene with iron oxide at an elevated temperature. A still further method comprises reacting cyclopentadiene with iron carbonyl. Still further, ferrocene has been prepared by reacting an iron salt such as ferrous chloride with a metallic derivative of cyclopentadiene such as cyclopentadienylsodium. While the prior methods have been moderately effective in preparing ferrocene in the laboratory, difficulty has been encountered when using the prior methods to prepare ferrocene commercially. Even greater difficulty has been experienced in attempting to prepare alkyl-substituted derivatives of ferrocene by the previously known methods.

In accordance with the present invention, an improved process is provided for producing ferrocene and its alkyl-substituted derivatives in high yields. The process comprises reacting solid anhydrous ferrous chloride with an excess of a saturated solution of sodium methoxide in methanol whereupon a reaction mixture comprising ferrous methoxide and sodium methoxide in methanol is obtained; introducing a small catalytic amount of iron powder into the reaction mixture thus obtained; thereafter reacting the ferrous methoxide-sodium methoxide in methanol and powdered iron mixture with a cyclopentadiene compound having the formula $C_5H_{6-n}R_n$ wherein R is selected from the group consisting of hydrogen and alkyl radicals having 1 to 4 carbon atoms and $n$ is an integer of 0 to 5; and thereafter separating the resultant dicyclopentadienyliron compound from the reacting mixture. It is essential in the process of the invention that the ferrous chloride be employed in the form of an anhydrous solid. For example, we have found that the use of solid anhydrous ferrous chloride results in a higher yield of the desired product. It is also essential that a small catalytic amount of iron powder be added to the reaction mass prior to adding cyclopentadiene or its alkyl-substituted derivatives. For example, we have found that the presence of a small amount of iron powder in the reaction mass significantly reduces undesired dimerization of cyclopentadiene and its alkyl-substituted derivatives. Reactions which take place in the process of our invention are believed to proceed in accordance with the following illustrative equations:

$$FeCl_2 + 2NaOCH_3 \rightarrow Fe(OCH_3)_2 + 2NaCl \quad (1)$$

$$2(C_5H_{6-n}R_n) + 2NaOCH_3 \rightarrow 2(C_5H_{5-n}R_nNa) + 2CH_3OH \quad (2)$$

$$2(C_5H_{5-n}R_nNa) + Fe(OCH_3)_2 \rightarrow (C_5H_{5-n}R_n)_2Fe + 2NaOCH_3 \quad (3)$$

where R is selected from the group consisting of hydrogen and alkyl radicals having 1 to 4 carbon atoms and $n$ is an integer of 0 to 5. It will be understood that the cyclopentadiene compound in Equation 2 can comprise a mixture instead of a single compound. Thus, for example, a mixture of cyclopentadiene and methylcyclopentadiene can be employed wherein the dicyclopentadienyliron product of Equation 3 may be a mixture of ferrocene, methylferrocene and 1,1'-dimethylferrocene.

Specific examples of dicyclopentadienyliron compounds which can be prepared in accordance with the process of the invention are:

ferrocene
methylferrocene
1,1'-dimethylferrocene
1,1'-diethylferrocene
1,1'-di-n-propylferrocene
1,1'-diisopropylferrocene
1,1'-di-n-butyl ferrocene
1,1'-diisobutylferrocene
1,1'-di-tertiary-butylferrocene
1,1',2,2'-tetramethylferrocene
1,1',3,3'-tetramethylferrocene
1,1',2,2'-tetraethylferrocene
1,1',2,2',-tetra-n-butylferrocene
1,1',2,2',3,3'-hexamethylferrocene
1,1',2,2',3,3',4,4'-octamethylferrocene
1,1',2,2',3,3',4,4',5,5'-decamethylferrocene As disclosed hereinabove, it is essential in the process of the invention that the ferrous chloride be employed as an anhydrous solid. Crystalline or solid anhydrous ferrous chloride is available commercially and can be variously prepared. Anhydrous ferrous chloride, for example, can be prepared by reducing ferric chloride with hydrogen. Anhydrous ferrous chloride can also be prepared by passing an electric current through ethereal solution of ferric chloride, the ferrous chloride being generated at the cathode.

Anhydrous ferrous chloride can also be prepared by heating metallic iron to a red heat in the presence of chlorine, ammonium chloride or dry hydrogen chloride. Still further, anhydrous ferrous chloride can be obtained by dissolving the hydrate of ferrous chloride in an ammonium chloride solution, evaporating the solution to dryness and then heating the residue in the absence of air to drive off water and ammonia. Still further, anhydrous ferrous chloride is obtained by refluxing anhydrous ferric chloride in an organic liquid which acts as a chlorine acceptor and as a dispersent for the iron salts. Suitable organic liquids which act as chlorine acceptors and dispersants for iron salts include chlorobenzene, toluene and highly aromatic petroleum fractions. The use of chlorobenzene as the organic liquid is especially desirable from a commercial standpoint in that its use results in the formation of a valuable by-product, i.e., p-dichlorobenzene. In a preferred embodiment, ferric chloride is refluxed under nitrogen with chlorobenzene at a temperature of about 130° to about 140° C. over a period of about one to about twenty hours, the exact amount of time depending upon completion of the reduction to ferorus chloride. The completion of the reduction is evidenced by the absence of evolved hydrogen chloride. When the reduction to ferrous chloride is complete, the reaction mixture is cooled after which ferrous chloride crystals are removed by filtration. The ferrous chloride crystals are then washed with a solvent such as benzene and dried under reduced pressure to give substantially pure-solid anhydrous ferrous chloride.

Solid anhydrous ferrous chloride is reacted with a saturated solution of sodium methoxide in methanol. In the process of our invention we employ a solution of sodium methoxide in methanol that contains slightly more than 30 percent sodium methoxide. In preparing a saturated solution of sodium methoxide, sodium in the form of shots or small pieces is added to methanol. Sodium shots can be prepared by melting sodium in a hot liquid hydrocarbn. The mixture is then stirred rapidly while cooling. This results in a dispersion of solid medium shots in liquid hydrocarbon. Small pieces of sodium can also be obtained by pressing sodium into a wire and then cutting the wire into small segments. Addition of sodium in the form of shots or freshly-cut small segments of wire reduces the time necessary to prepare a saturated solution of sodium methoxide in methanol. After the sodium is added to methanol, the mixture is refluxed initially by the heat given off when sodium reacts with methanol. As the concentration of slighlty over 30 percent sodium methoxide in methanol is approached, external heating to about 40° to 50° C. is applied to complete the reaction. In the process of the invention the saturated solution (>30%) of sodium methoxide in methanol is used immediately after it is prepared and while it is still warm since upon cooling the solution jells and partially solidifies.

In reacting solid anhydrous ferrous chloride with a solution (>30%) of sodium methoxide in methanol, the reaction mixture is maintained at a temperature of about 40° to about 60° C., for a period of about ½ to about 2 hours. The reaction is conducted under a blanket of dry nitrogen. It is preferred to add the ferrous chloride to an excess of the sodium methoxide. The amount of the sodium methoxide employed is more than sufficient to react with all of the ferrous chloride to form ferrous methoxide; the amount of sodium methoxide remaining after reaction with ferrous chloride is sufficient to react with the cyclopentadiene or alkyl-substituted cyclopentadiene added subsequently to form cyclopentadienylsodium or alkyl-substituted cyclopentadienylsodium. The sodium methoxide is employed in amounts of about 4 to about 10 moles per mole of ferrous chloride. It is preferred, however, to employ about 4 to about 6 moles of sodium methoxide per mole of ferrous chloride.

A small amount of iron powder sufficient to inhibit dimerization of the cyclopentadiene compound is added to the reaction mass comprising sodium methoxide and ferrous methoxide in methanol before cyclopentadiene or an alkyl-substituted cyclopentadiene is introduced into the the mass. The amount of the iron powder employed is a small or catalytic amount comprising about 0.1 to about 0.5 percent by weight based on the amount of cyclopentadiene or alkyl-substituted cyclopentadiene to be used.

Cyclopentadiene and alkyl-substituted cyclopentadienes are available commercially and can be variously prepared so that neither the cyclopentadiene compounds per se nor the process by which they are obtained constitutes a portion of the present invention. Specific examples of some of the cyclopentadienes which we can use are cyclopentadiene, methyl cyclopentadiene, ethylcyclopentadiene, n-propylcyclopentadiene, isopropylcyclopentadiene, n-butylcyclopentadiene, isobutylcyclopentadiene, tertiary-butylcyclopentadiene, dimethylcyclopentadiene, trimethylcyclopentadiene, tetramethylcyclopentadiene, pentamethylcyclopentadiene and mixtures thereof.

The reaction of cyclopentadiene or alkyl-substituted cyclopentadiene with the mixture of sodium methoxide, ferrous methoxide and iron powder in methanol is conducted under a blanket of nitrogen at temperatures of about 20° to about 100° C., preferably about 50° to about 70° C. The reaction is usually completed in about 2 to about 20 hours, and in the temperature range of about 50° to about 70° C. within about 5 to about 10 hours. The cyclopentadiene or alkyl-substituted cyclopentadiene is added slowly and is employed in an amount sufficient to react with the sodium methoxide present in the methanol solution of ferrous methoxide and sodium methoxide. While good yields can otherwise be obtained, we have found that even better yields of the desired product are obtained by the slow and gradual addition of the cyclopentadiene compound to the reaction mass. It is preferred to employ up to 2 moles of cyclopentadiene or alkyl-substituted cyclopentadiene per mole of ferrous chloride. While more than 2 moles of the cyclopentadiene or derivative thereof can be employed, it is economically undesirable to do so. At the completion of the reaction of the cyclopentadiene, the resultant dicyclopentadienyliron compound is recovered from the reaction mass.

Recovery of the dicyclopentadienyliron compound from the reaction mass can be accomplished in various ways. In a preferred embodiment, the reaction mass is admixed with a dilute aqueous mineral acid and an organic solvent. The mineral acid, for example, can be sulfuric acid or hydrochloric acid. The organic solvent is advantageously petroleum ether. The volume of the aqueous mineral acid is advantageously 3 to 4 times the volume of the reaction mixture. The concentration is advantageously adjusted so that after the reaction mass has been added, an excess of acid remains. The volume of the organic solvent is advantageously 1 to 2 times the volume of the reaction mixture. After the reaction mass has been thoroughly admixed with the dilute aqueous acid and organic solvent the mixture is allowed to remain quiescent until a blue aqueous layer and a petroleum ether layer forms. The ether layer contains a major amount of the dicyclopentadienyliron product whereas the aqueous layer contains by-products and a small amount of the oxidized dicyclopentadienyliron. After separation, the aqueous layer is admixed with a small amount of a reducing agent such as sodium thiosulfate or stannous chloride then extracted with a hydrocarbon solvent such as petroleum ether to remove an additional amount of dicyclopentadienyliron product, When petroleum ether is used, the ethereal solutions are combined and filtered through an adsorbent bed to remove inorganic and diene impurities. The combined ethereal solutions are then washed with water until neutral. The neutral ethereal solution is then dried over a drying agent and filtered after which the ether is removed by any convenient means such as by flash evaporation. The product thus obtained comprises a high yield of substantially pure dicyclopentadienyliron compound.

The invention may be more fully understood by reference to the following illustrative example.

EXAMPLE

Preparation of >30% sodium methoxide in methanol 305 grams (13.3 g. atoms) of freshly cut sodium are added in small pieces to 2500 ml. of methanol in a 5-liter flask over a period of 4 hours. The flask is heated to reflux methanol for several hours until the formation of sodium methoxide is substantially complete. The methanol solution of sodium methoxide (slightly over 30% sodium methoxide) thus obtained is allowed to cool to 40° C. for use in preparing ferrous methoxide as described hereinbelow.

Preparation of ferrous chloride

Ferrous chloride is prepared by adding 520 grams (3.2 moles) of anhydrous ferric chloride to 1,000 ml. (9.8 moles) of chlorobenzene in a 3 liter flask and refluxing the mixture under nitrogen for about 3 hours, or until the evolution of hydrogen chloride ceases. The mixture is then allowed to cool and is poured into a sintered glass funnel. The ferrous chloride crystals thus obtained are washed repeatedly with benzene. A major portion of the benzene is removed from the ferrous chloride crystals by the application of a house vacuum (50 mm. Hg.) to give bright bronze crystals. The ferrous chloride crystals thus obtained are dried overnight in a desiccator under vacuum (5 mm. Hg.) whereupon 395 grams (3.1 moles) of anhydrous ferrous chloride is obtained.

Preparation of ferrous methoxide 395 grams (3.1 moles) of anhydrous ferrous chloride crystals obtained in accordance with the above procedure are added in small increments under nitrogen over a 30-minute period to 13.3 moles of the >30% sodium methoxide solution in methanol, obtained as described above, at a temperature of about 40° C. One gram of iron powder is added. The iron powder comprises about 0.2 percent by weight based on the weight (468 grams) of the methylcyclopentadiene to be added in the next step of the process. Upon stirring the mixture for an additional 30 minutes, the temperature increases to about 45° C.

Preparation of 1,1'-dimethylferrocene 468 grams (5.85 moles) of methylcyclopentadiene are withdrawn in about 100 ml. portions from a cold flask (Dry ice-acetone) and added dropwise under nitrogen to the brown reaction mixture of ferrous methoxide and sodium methoxide in methanol which contains powdered iron obtained as described above. The temperature of the reactants is maintained at about 55° to about 70° C. The addition is completed in about 6 hours. Stirring and heating of the reaction mass at about 55° C. is continued for 5 hours. Thereafter, the reaction mass is cooled to room temperature (23° C.) and stirred for an additional 10 hours. The reaction mixture is then poured into a separatory funnel which contains 800 grams of concentrated sulfuric acid in 6 liters of cold water and 3 liters of petroleum ether. The mixture is shaken and then allowed to stand for separation into a blue aqueous layer and a petroleum ether layer which contains a major amount of the 1,1'-dimethylferrocene. The aqueous layer is treated with sodium thiosulfate and then extracted with petroleum ether to recover an additional quantity of 1,1'-dimethylferrocene. The ethereal solutions are combined and filtered. The ethereal solution is then washed repeatedly with water until neutral. The petroleum ether solution is then dried over "Drierite," filtered and evaporated in a continuous flash evaporator. Final evaporation is conducted at 2 mm. Hg pressure and 80° C. 600 grams of a brown solid melting at 38° C. is obtained, equivalent to a yield of 96% of the theory. Analysis of the product gives an iron content of 22.6%. The yield based on iron content is 84%. The infrared spectrum of the product does not differ from the spectrum for purse 1,1'-dimethylferrocene.

Ferrocene and alkyl-substituted ferrocenes other than 1,1'-dimethylferrocene can similarly be prepared in accordance with the above procedure wherein methylcyclopentadiene is replaced by cyclopentadiene, other alkyl cyclopentadienes and mixtures thereof. Such other alkyl cyclopentadienes, by way of example, include ethylcyclopentadiene, n-propylcyclopentadiene, isopropylcyclopentadiene, n-butylcyclopentadiene, isobutylcyclopentadiene, tertitary - butylcyclopentadiene, dimethylcyclopentadiene, trimethylcyclopentadiene, tetramethylcyclopentadiene and pentamethylcyclopentadiene.

In order to illustrate the importance of utilizing solid anhydrous ferrous chloride in the process of the invention, comparative experiments were conducted wherein the use of solid anhydrous ferrous chloride was compared with the use of an alcoholic solution of ferrous chloride. In conducting the experiments using an alcoholic solution of ferrous chloride, the ferrous chloride was prepared by reducing ferric chloride with iron in the presence of methanol. To the alcoholic solution of ferrous chloride thus obtained without separating the ferrous chloride was added an alcoholic solution of sodium methoxide followed by methylcyclopentadiene. The mole ratio of sodium methoxide to ferrous chloride was varied from about 4 to 1 to about 8 to 1. The mole ratio of methylcyclopentadiene to ferrous chloride was about 2 to 1. When a 33 percent solution of sodium methoxide in methanol was employed, the yield of 1,1'-dimethylferrocene was 51.5%. When less than saturated solutions of sodium methoxide in methanol were employed, i.e., 26 to 30 percent sodium methoxide in methanol, the yields of 1,1'-dimethylferrocene varied from 33 to 50 percent. When the process of the invention was followed wherein anhydrous ferrous chloride crytsals were added to >30 percent sodium methoxide solution in methanol (mole ratio of sodium methoxide to ferrous chloride about 4 to 1), followed by the addition of a catalytic amount of iron powder (0.2 percent iron powder based on methylcyclopentadiene) and slow addition of methylcyclopentadiene (mole ratio of methylcyclopentadiene to ferrous chloride about 2 to 1), the yield of 1,1'-dimethylferrocene obtained was 84 percent, based on the iron content of the product. This yield comprises a 63 percent increase over the best yield obtained with an alcoholic solution of ferrous chloride.

While our invention has been described with reference to various specific examples and embodiments, it will be understood that the invention is not limited to such examples and embodiments and may be variously practiced within the scope of the claims hereinafter made.

We claim:
1. A process for producing a dicyclopentadienyliron compound which comprises:
   (1) reflecting ferric chloride under nitrogen with chlorobenzene at a temperature of about 130° to about 140° C. for a time sufficient to effect substantially complete reduction of ferric chloride to ferrous chloride;
   (2) separating ferrous chloride from the reaction mixture of (1) and drying the separated ferrous chloride to obtain substantially pure solid anhydrous ferrous chloride;
   (3) reacting the pure solid anhydrous ferrous chloride of (2) at a temperature of about 40° to about 60° C. with a saturated solution (>30%) of sodium methoxide in methanol, the mole ratio of sodium methoxide to ferrous chloride being about 4 to about 10 moles of sodium methoxide per mole of ferrous chloride;
   (4) introducing a small amount of iron powder into the reaction mixture of (3), said small amount being sufficient to inhibit the dimerization of the cyclopentadiene compound reacted in (5);

(5) reacting the reaction mixture of (4) at a temperature of about 20° to about 100° C. with a cyclopentadiene compound having the formula $C_5H_{6-n}R_n$ wherein R is selected from the group consisting of hydrogen and alkyl radicals having 1 to 4 carbon atoms and $n$ is an integer of 0 to 5 to effect the formation of a dicyclopentadienyliron compound, the amount of said cyclopentadiene compound comprising up to 2 moles of cyclopentadiene compound per mole of ferrous chloride reacted in (3); and (6) separating the dicyclopentadienyliron compound from the reaction mixture of (5).

2. The process of claim 1 wherein the cyclopentadiene compound is cyclopentadiene.

3. The process of claim 1 wherein the cyclopentadiene compound is methylcyclopentadiene.

4. A process for producing a dicyclopentadienyliron compound which comprises:

(1) refluxing ferric chloride under nitrogen with chlorobenzene at a temperature of about 130° to about 140° C. for a time sufficient to effect substantially complete reduction of ferric chloride to ferrous chloride;

(2) separting ferrous chloride from the reaction mixture of (1) and drying the separated ferrous chloride to obtain substantially pure solid anhydrous ferrous chloride;

(3) reacting the pure solid anhydrous ferrous chloride of (2) at a temperature of about 40° to about 60° C. with a saturated (>30%) of sodium methoxide in methanol, the mole ratio of sodium methoxide to ferrous chloride being about 4 to about 10 moles of sodium methoxide per mole of ferrous chloride;

(4) introducing a small amount of iron powder into the reatcion mixture of (3), said small amount being sufficient to inhibit the dimerization of the cyclopentadiene compound reacted in (5);

(5) reacting the reaction mixture of (4) at a temperature of about 20° to about 100° C. with a cyclopentadiene compound having the formula $C_5H_{6-n}R_n$ wherein R is selected from the group consisting of hydrogen and alkyl radicals having 1 to 4 carbon atoms and $n$ is an integer of 0 to 5 to effect the formation of a dicyclopentadienyliron compound, the amount of said cyclopentadiene compound comprising up ot 2 moles of cyclopentadiene compound per mole of ferrous chloride reacted in (3);

(6) admixing the reaction mixture of (5) with a dilute aqueous mineral acid and an organic solvent for the dicyclopentadienyliron compound whereupon the mixture after remaining quiescent forms an aqueous layer and an organic solvent layer;

(7) admixing the aqueous layer of (6) with a reducing agent and with an additional quantity of organic solvent to effect further solution of the dicyclopentadienyliron compound in an organic solvent layer which forms upon a period of quiescence; and (8) recovering a substantially pure dicyclopentadienyliron compound from the combined organic solvent layers of (6) and (7).

5. The process of claim 4 wherein the cyclopentadiene compound is cyclopentadiene.

6. The process of claim 4 wherein the cyclopentadiene compound is methylcyclopentadiene.

References Cited
UNITED STATES PATENTS 3,217,022　11/1965　Cordes _____ 260—439

OTHER REFERENCES

Cordes: Z. Naturporschg., 21b (1966), pp. 746–751.
Kovacic et al.: J. Am. Chem. Soc., 76 (1954), pp. 5491–5493.

TOBIAS E. LEVOW, Primary Examiner

A. P. DEMERS, Assistant Examiner

U.S. Cl. X.R.

44—68; 260—999